US005557530A

United States Patent [19]

Guglielmi

[11] Patent Number: 5,557,530

[45] Date of Patent: Sep. 17, 1996

[54] SYSTEM FOR SYNTHESIZING MICROWAVE FILTERS IN A RECTANGULAR WAVEGUIDE

[75] Inventor: Marco Guglielmi, Wassenaar, Netherlands

[73] Assignee: Agence Spatiale Europeene, Paris, France

[21] Appl. No.: 49,930

[22] Filed: Apr. 20, 1993

[30] Foreign Application Priority Data

Apr. 29, 1992 [FR] France .................................... 9205271

[51] Int. Cl.[6] ...................................................... G06F 17/50

[52] U.S. Cl. .......................... 364/488; 364/578; 333/157; 333/241; 333/242

[58] Field of Search .................................... 364/489, 488, 364/572, 578; 333/166, 202, 204, 206, 175, 132, 219, 157, 241, 242

[56] References Cited

U.S. PATENT DOCUMENTS

| | | | |
|---|---|---|---|
| 3,573,674 | 4/1971 | Wehner | 333/73 |
| 4,280,113 | 7/1981 | Sekiguchi | 333/202 |
| 4,492,425 | 1/1985 | Kersten et al. | 350/96.14 |
| 4,720,160 | 1/1988 | Hicks, Jr. | 350/96.15 |
| 4,763,089 | 8/1988 | Pon | 333/202 |
| 5,046,016 | 9/1991 | Krill et al. | 364/488 |
| 5,068,569 | 11/1991 | Busacca et al. | 315/3.5 |
| 5,184,096 | 2/1993 | Wakino et al. | 333/175 |
| 5,220,300 | 6/1993 | Snyder | 333/210 |
| 5,305,335 | 4/1994 | Ball et al. | 372/6 |

OTHER PUBLICATIONS

Chen et al., "A Novel Coupling Method for Dual Mode Waveguide or Dielectric Resonator Filters,", IEEE, MTT, 1990, pp. 219–222.

Arndt et al., "Modal S–Matrix Design of Microwave Filters Composed of Rectangular and Circular Waveguide Elements," IEEE MTT, 1991, pp. 535–538.

F. Arndt et al., "The Rigorous CAD of Aperture–Coupled T–Junction Bandstop–Filters, E–Plane Circuit Elliptic–Function Filters, and Diplexers", 1991 IEEE, pp. 1103–1106.

Ihmds et al., "Rigorous Modal S–Matrix Analysis of the Cross–Iris in Rect. Waveguides", IEEE, 1993, pp. 400–402.

Liang et al., "Molding of Cylindrical Dielectric Resonators in Rect. Waveguides & Cavities" IEEE, 1993, pp. 2174–2181.

Accatino et al., "Design of Coupling Irises Between Circular Cavities by Modal Analysis," IEEE, 1994, pp. 1307–1313.

J. S. Hong, et al., "Computer–Aided Design of Millimeter–Wave Fin–Line Bandpass Filters," 12th International Conference on Infrared and Millimeter Waves, Dec. 14–18, 1987, Orlando, Florida, pp. 284–285, IEEE, New York 1987.

W. Mahler, et al., "CAD of Waveguide Band–Pass Filters for Applications in Millimeterwave Radar Frontends," 18th European Microwave Conference Proceedings Sep. 12–15, 1988, Stockholm, Sweden, pp. 659–664, Microwave Exhibitions and Publishers Ltd., Tunbridge Wells, Great Britain 1988.

F. Arndt, et al., "Modal–S–Matrix Design of Microwave Filters Composed of Rectangular and Circular Waveguide Elements," 1991 IEEE MTT–S International Microwave Symposium–Digest, Jun. 10–14, 1991, Boston, Massachusetts, pp. 535–538, IEEE, New York 1991.

M. Guglielmi, et al., "Rigorous, Multimode Equivalent Network Representation of Inductive Discontinuities," IEEE Transactions on *Microwave Theory and Techniques*, vol. 38, No. 11, Nov. 1990, New York, pp. 1651–1659.

*Primary Examiner*—Kevin J. Teska
*Assistant Examiner*—Thai Phan
*Attorney, Agent, or Firm*—Barry R. Lipsitz; Ralph F. Hoppin

[57] ABSTRACT

A system for synthesizing a microwave filter including a plurality of resonators having no tuning elements, in particular waveguide filters for use in satellite telecommunications networks. Signals representing the coupling coefficients of the coupling elements having a finite thickness and the resonant frequency of the resonators are stored in an electronic memory. A computation unit is controlled by a control unit arranged to determine automatically, in a single run, the widths of the coupling elements and the lengths of the resonators from the signals representing the coupling coefficients.

12 Claims, 6 Drawing Sheets

SYSTEM FOR SYNTHESIZING MICROWAVE FILTERS IN A RECTANGULAR WAVEGUIDE

BACKGROUND OF THE INVENTION

The present invention relates to the manufacture of microwave filters and it concerns in particular a system for synthesising discontinuity microwave filters for use in a satellite telecommunications network.

Microwave filters are commonly used in satellite payloads as constituent parts of output multiplexing networks. It is of particular importance in said application to avoid the passive intermodulation products that can seriously deteriorate the transmission performance. To avoid the passive intermodulation products it is necessary that the filter cells be calculated and implemented very accurately so that all tuning elements that can generate the passive intermodulation products are eliminated.

A microwave filter consists of a rectangular or circular waveguide in which discontinuities are formed to provide a plurality of cavities that are coupled to each other to allow the waves to propagate through the waveguide. Each cavity includes at least one tuning element serving to tune the resonant frequency of each cavity.

The development of a waveguide filter has always involved a significant experimental effort. After having defined the electrical characteristics of the filter to be designed, the equivalent electric network of the filter is determined. Thereafter, the geometrical dimensions of the cavities or resonators to be implemented in the filter are determined. The complete filter is then assembled and the electrical characteristics thereof are measured, and thereafter the tuning elements are adjusted manually in order to tune the measured electrical characteristics so that they comply with the desired characteristics.

In a microwave filter, however, the tuning of any resonator in the complete filter influences the electrical behavior of the preceding resonators as a result of interactions between the higher-order propagation modes. It is therefore necessary to measure the electrical characteristics of each coupling element after any individual tuning of a tuning element. A complete characterization of the coupling elements requires the measurements and adjustments to be repeated for each frequency in the filter bandwidth. Accordingly, the development of a microwave filter is a time-consuming task which requires considerable time for the tuning procedure when somewhat sophisticated filters are to be designed.

The electromagnetic analysis of the discontinuities in waveguides has been the subject matter of a number of publications which have proposed equivalent network representations for waveguide discontinuities using equivalent networks that are useful for deriving the computation of the physical elements. These known representations are divided into two groups. The representations of the first group reduces the discontinuity to a network and an integral equation that represents the effect of the higher-order propagation modes on the fundamental mode only of the waveguide (see e.g. N. Marcuvitz, Waveguide Handbook, McGraw-Hill Book Co., New York, 1951). The integral equation as proposed is a very efficient computation tool but the result thereby obtained is strongly limited in that it does not take into account the interactions between higher-order modes.

The known representations of the second group take into account the interactions between higher-order propagation modes. An example is the mode-matching method that is disclosed by T. Itoh in Numerical Technique for Microwave and Millimeter-Wave Passive Structures, John Wiley and Sons, Inc., New York, 1989. The drawback of this technique resides in that it results in a very slow convergence of the results and that it does not provide an explicit network form. In particular, most of the computation must be effected for each frequency and to ensure the proper convergence it is often necessary to explicitly consider a large number of modes thus resulting in very long computation run times that are generally not acceptable when optimization is required.

A novel formulation has been developed recently for deriving multi-mode equivalent networks for zero-thickness inductive discontinuities in a waveguide (M. Guglielmi and C. Newport, Rigourous, Multimode Equivalent Network Representation of Inductive Discontinuities, IEEE Transactions on Microwave Theory and Technique, Vol. 38, No. 11, November 1990). This particular formulation makes it possible to represent the coupling between the higher-order modes by a coupling matrix in form of impedances or admittances which are defined via an integral equation that is essentially independent from frequency and from the absolute dimensions. After the discontinuity has been characterized by solving the integral equation, the frequency dependence is introduced through a set of linear equations. This decomposition makes this approach numerically very efficient and very rapidly convergent. This solution is limited by the zero-thickness assumption for the discontinuity, however, wherein the discontinuity, either window or obstacle, is provided in a simple thin plate.

Now, the problem that claims the attention in designing sophisticated waveguide filters intended for use on satellites consists in designing waveguide filters including step discontinuities. To solve this problem, no practical solution was available heretofore, which overcomes the time-consuming manual tuning procedures or long run-time software optimization procedures.

The object of the present invention is to solve this problem and to that effect it provides an automatic system for synthesising a microwave filter with a rapid synthesis convergence, thus substantially reducing production time and cost.

SUMMARY OF THE INVENTION

In accordance with the invention, a system is provided for synthesising a microwave filter comprised of a rectangular waveguide including a plurality of resonators having no tuning elements. The resonators are coupled between each other by means of coupling elements having a finite thickness. The system comprises an electronic memory, a computation unit and a control means. In use, signals representing the coupling coefficients for the coupling elements and %he resonant frequency for the resonators are stored in the electronic memory. In response to signals representing a predetermined thickness for the coupling elements and to an initial length for the resonators, the computation unit is controlled to determine the variation in the relative width for the coupling elements as a function of the coupling coefficients and the resonant frequency stored in the memory. The values for the relative width are read into the memory, the coupling coefficient values stored in the memory are retrieved and the computation unit determines the variation in the apparent resonator length as a function of the coupling coefficients. The width of each coupling element seen by each resonator is determined and displayed, and then the design length of each resonator is determined and displayed taking into account the respective contributions of the two coupling elements at both ends of the resonator considered. The operations are repeated until the width of all coupling elements and the lengths of all resonators have been determined.

The system according to the invention provides a very efficient tool useful to determine, practically in one single run, the geometric parameters of a discontinuity waveguide filter with a satisfactory accuracy and within a very short time. As compared with the conventional mode-matching method, designing a five-resonator microwave filter using the procedure of the invention is fourteen times faster for 200 frequency points.

BRIEF DESCRIPTION OF THE DRAWINGS

The invention is described in more detail hereinafter with reference to the appended drawings, in which.

DETAILED DESCRIPTION OF THE PREFERRED EMBODIMENT

Figure 1:
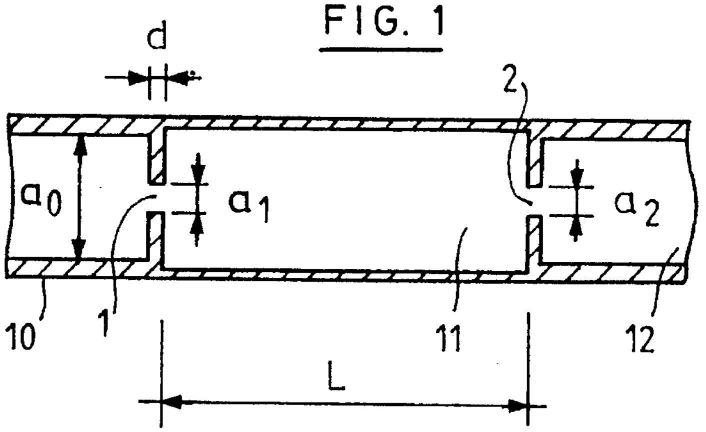
FIG. 1 diagrammatically represents an exemplary embodiment of a coupling iris waveguide filter.

Referring to FIG. 1 there is represented a microwave filter consisting of a rectangular waveguide 10 including a plurality of resonators 11, 12, . . . coupled between each other by coupling elements 1, 2, . . . which consist here of windows or irises formed in the partitions. The coupling elements can also consist of obstacles accommodated within the guide. Depending on the orientation relative to the electrical field within the guide, a coupling element, from the point of view of the electric analysis, is an inductive or a capacitive element.

The purpose is to design a microwave filter having a given passband with a predetermined center frequency $f_o$. The problem to be solved for designing the filter consists in determining the geometrical dimensions of the filter, i.e. the width of the waveguide 10, the width of each of the coupling irises 1, 2, . . . and the length $\underline{L}$ of the resonators 11, 12, . . . and of the input and output guides. The waveguide width is determined by the frequency $f_o$ while the frequency bandwidth defines the coupling coefficients of the irises 1, 2, . . . . The object of the system according to the invention is to determine the widths $a_i$ of the coupling irises and the lengths of guide portions taking into account the coupling values between the higher-order propagation modes.

It is known that the coupling provided by a coupling element (iris or obstacle) can be represented by means of an impedance and it is also known that an impedance is a function of the frequency. Furthermore, it is known that the couplings between propagation modes can be represented by a coupling matrix in the form of impedances or admittances, which coupling matrix is usually frequency dependent.

The system according to the invention, on the contrary, is based on the use of a coupling matrix that does not depend on frequency. This coupling matrix can be represented in the form:

$$Zm,n=\int Mn(x')\ Ao\ hm(x')\ ds' \quad (1)$$

where:

Mn(x') represents a known expansion function of the partial magnetic current,

Ao is a vectorial constant, hm(x') represents a modal function of the rectangular waveguide.

By virtue of equation (1) of the coupling matrix adopted for embodying the invention, the modal voltage Vm at a coupling element can be written in the form:

$$Vm=\sum_{n=1}^{\infty}\bar{I}_n^{(1)}Zm,n-\sum_{n=1}^{\infty}\bar{I}_n^{(2)}Zm,n \quad (2)$$

where:

$\bar{I}^{(1)}$ is the current through the admittance above the coupling element, $\bar{I}^{(2)}$ is the current through the admittance below the coupling element.

Figure 2:
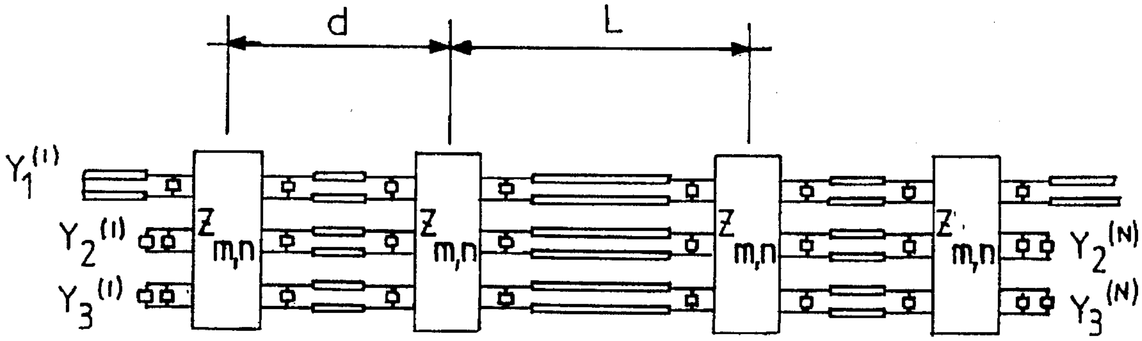
FIG. 2 shows the multimode equivalent network representation of a waveguide resonator.

This makes it possible to advantageously represent a resonator by a multimode equivalent electric network as shown in FIG. 2. Each coupling element with a given thickness d is represented by a line portion serially connected between two coupling matrices defining the coupling upstream and the coupling downstream respectively.

It is particularly worthy of note that the coupling matrix Zm,n on which the implementation of the invention is based only depends on the geometrical parameters of the coupling element, which will allow, in accordance with the invention, the dimensions of each coupling element to be determined in one single run, thus avoiding all of the experimental work and all of the manual tunings that are traditionally required for the manufacture of microwave filters.

Figure 3:
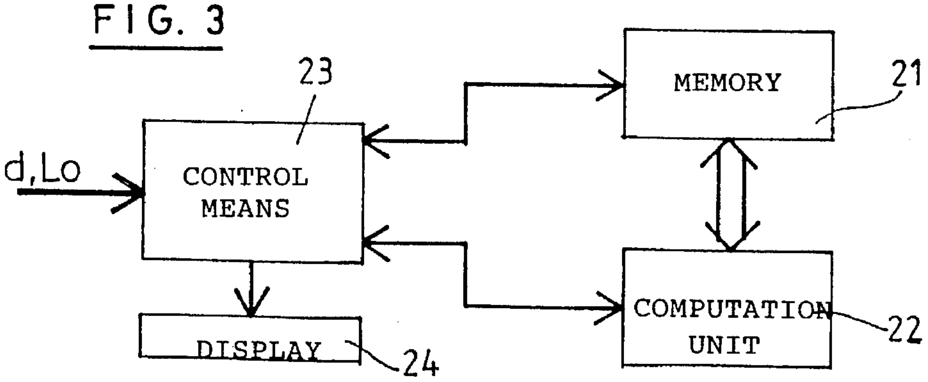
FIG. 3 is a block diagram of the system according to the invention.

As shown in FIG. 3, the system according to the invention comprises an electronic memory 21, a computation unit 22 and a control means 23 cooperating with a display device 24. In accordance with the invention, the control means 23 is arranged to control the computation unit in response to a command signal so as to determine directly the dimensions of the coupling elements of the resonators, thereby to automatically synthesise waveguide filters having no tuning screws.

Figure 4:
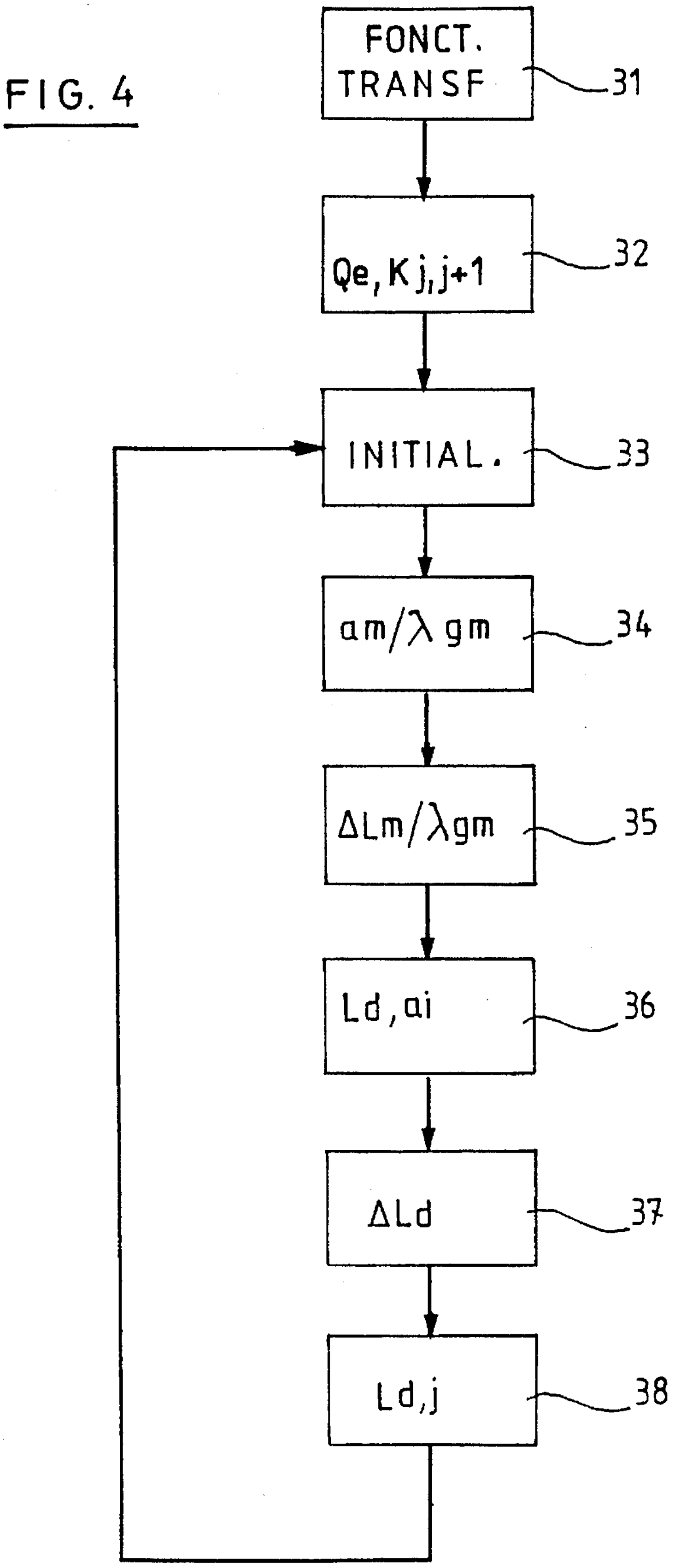
FIG. 4 is a flow diagram illustrating the filter design procedure according to the invention.
Figure 5:
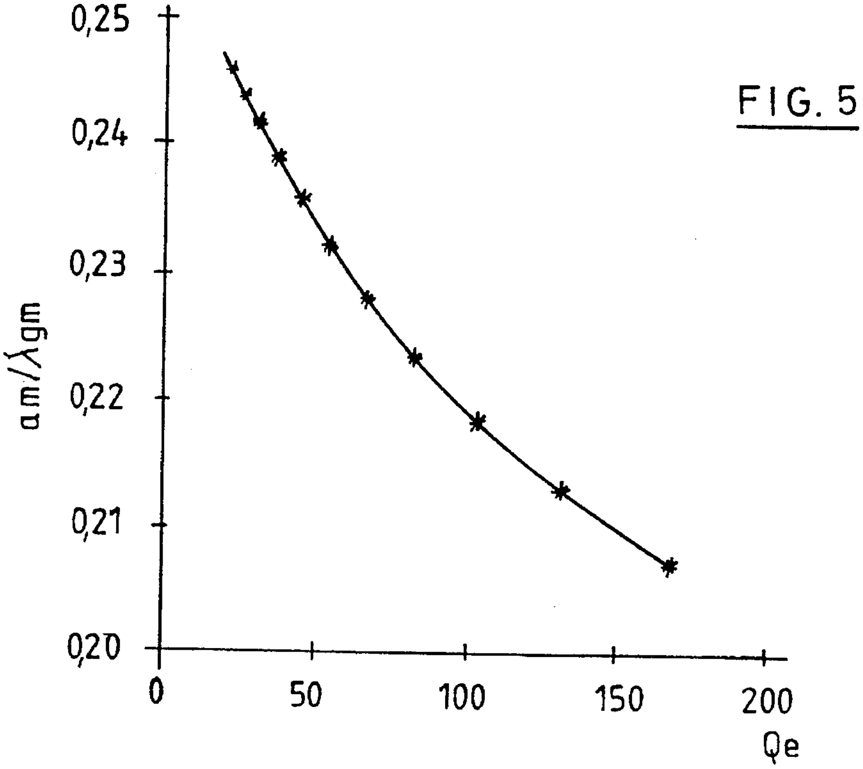
FIG. 5 shows a typical curve of the relative width of a coupling element as a function of the external coupling coefficient.
Figure 6:
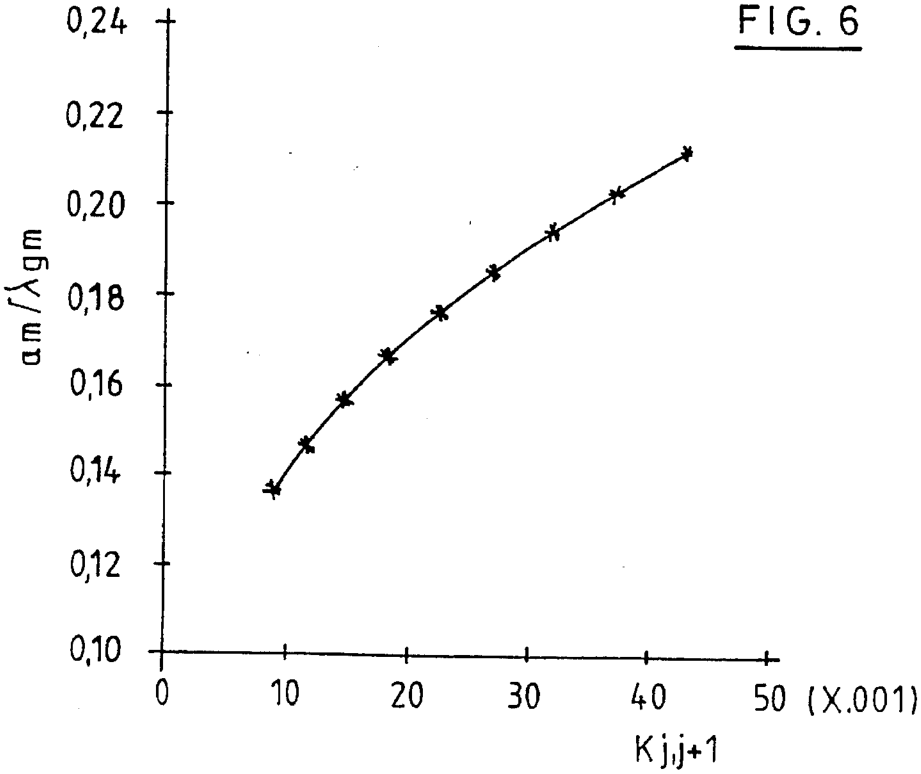
FIG. 6 shows a typical curve of the relative width of a coupling element as a function of the internal coupling coefficient.
Figure 7:
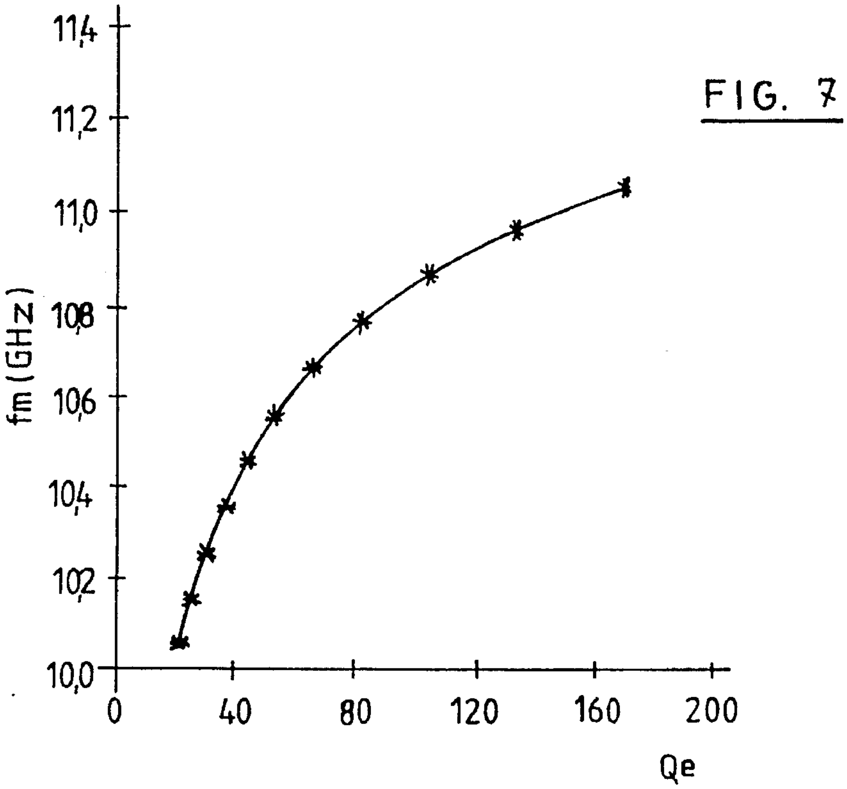
FIGS. 7 and 8 show typical curves of the relative width of a coupling element as a function of the resonant frequency.
Figure 8:
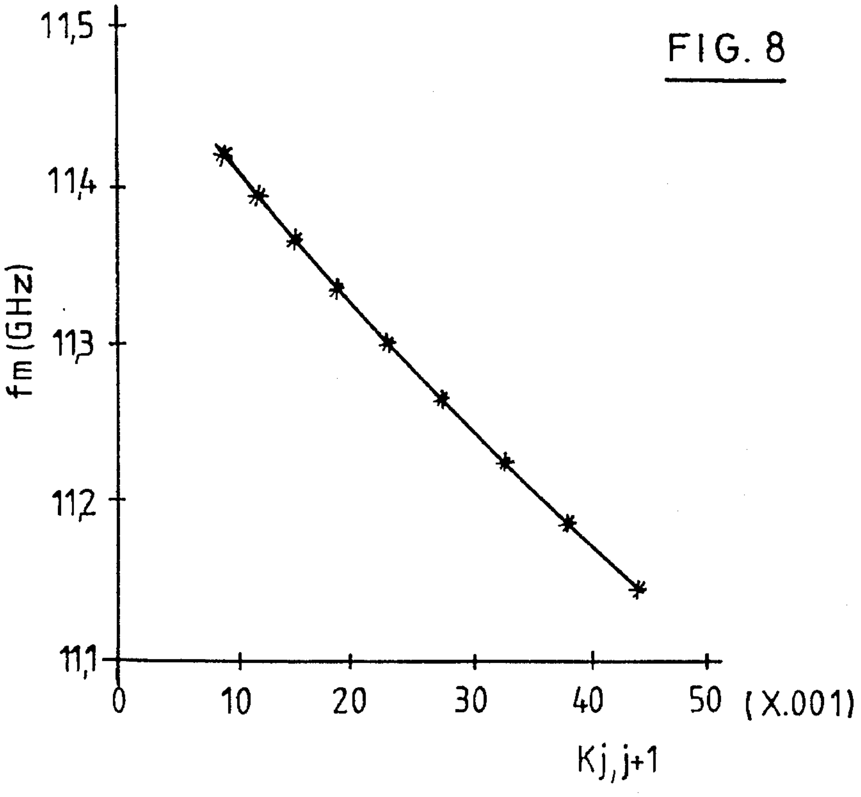

The design method of the invention is illustrated by the flow diagram of FIG. 4. The first step in the design of a waveguide filter consists in selecting the proper transfer function and the theoretical equivalent network that defines the filter in terms of external coupling coefficient $Q_e$ and internal coupling coefficients $k_{j,j+1}$ (block 31).

From the value of the selected transfer function, the system according to the invention is arranged for describing the real structure of the filter in the form of the equivalent network shown in FIG. 2 and for automatically determining the external coupling coefficient $Q_e$ and the internal coupling coefficients $k_{j,j+1}$ that are related to the transfer function by known relations stored in the memory (block 32). Once the external and internal coupling coefficients are determined and stored, the system proceeds to determine the widths of the coupling elements to obtain the required coupling values and the resonator lengths corresponding to the center frequency $f_o$ of the passband of the filter to be designed.

It is at this stage of the method that the system according to the invention is full of interest and affords incomparable advantages.

A value for the thickness of the coupling elements (e.g. 2 mm) and an initial value for the resonator length L are introduced into the system so as to realize a half-wave resonator at a frequency slightly higher than the center frequency $f_o$ (block 33). In response to the signals representing these values, the system controls the computation unit thereby to determine the values of the variation curves of the relative width $a_m/\lambda_{gm}$ as a function of the coupling coefficients $Q_e$ and $k_{j,j+1}$ and as a function of the design resonance frequency $f_m$ (block 34), and these values are then read into the memory. Typical curves are shown in FIGS. 5, 6, 7 and 8.

The symbols with the subscript m here represent already stored values. Hereinafter, the symbols with the subscript d represent the required design values.

In order to provide accurate results, the system must explicitly include at least six modes in the computation of each resonator to ensure a proper convergence of the design parameters thus determined.

The system thereafter proceeds to read out the values $a_m/\lambda_{gm}$ from the memory as a function of the resonance frequency and it then establishes the curves representing the apparent resonator length increase $\Delta L_m/\lambda_{gm}$ as a function of the coupling coefficients $Q_e$ and $k_{j,j+1}$ due to the loading introduced by the coupling irises for the resonator (block 35). The data of these curves are stored into the memory. Typical curves are shown in FIGS. 9 and 10.

The system can then proceed to the initial selection of the geometrical parameters by first computing the resonator length $L_d$ that would give a half-wave resonator at the design resonance frequency $f_d$. Then, the iris widths $a_1$ and $a_2$ corresponding to the desired coupling coefficients $Q_e$ and $k_{j,j+1}$ (block 36) are computed using the following relation:

$$a_d = \frac{a_m}{\lambda_{gm}}\,\lambda_{gd}\,\frac{f_d}{f_m} \tag{3}$$

Figure 9:
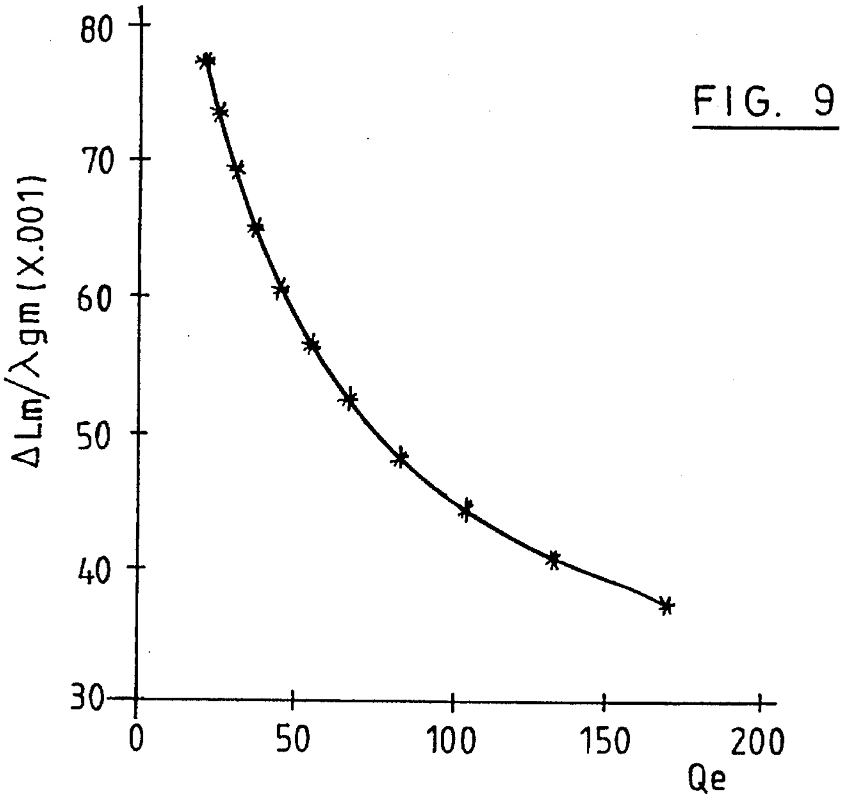
FIG. 9 shows a typical curve of the increase in apparent length of a resonator as a function of the external coupling coefficient.
Figure 10:
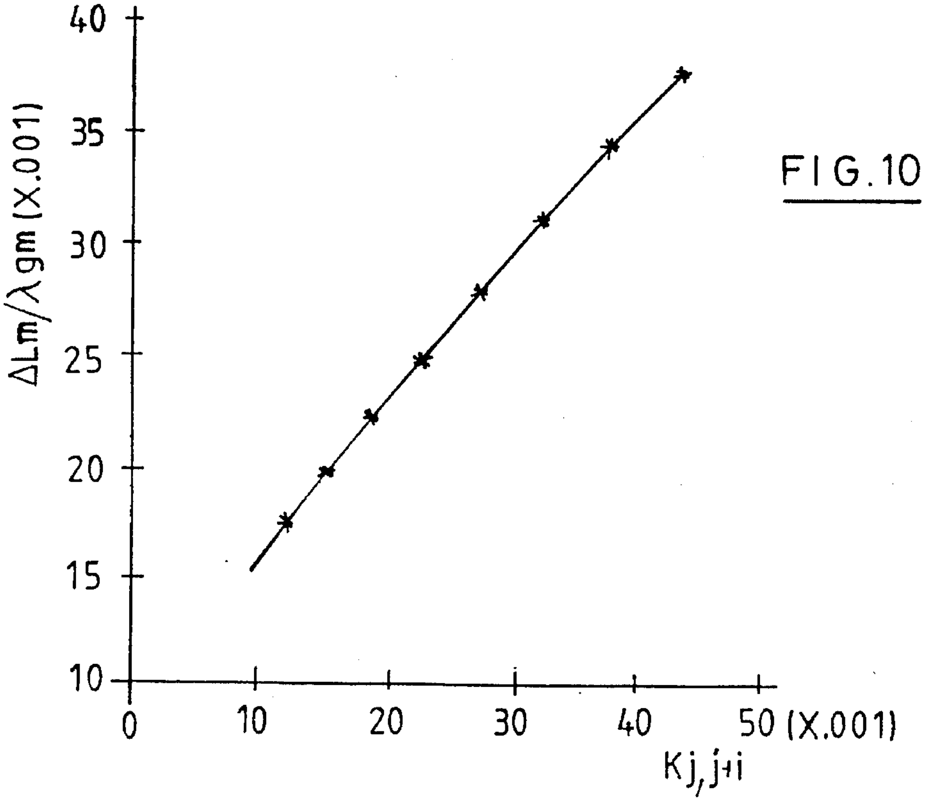
FIG. 10 shows a typical curve of the increase in apparent length of a resonator as a function of the internal coupling coefficient.

The individual resonator length is adjusted (block 37) using the data from the curves in FIGS. 9 and 10 and using relation:

$$\Delta L_d = \frac{\Delta L_m}{\lambda_{gm}}\,\lambda_{gd} \tag{4}$$

so that the required design length $L_{dj}$ is given by relation:

$$L_{dj} = \frac{\lambda_{gd}}{2} - \Delta L_{dj} - \Delta L_{dj+1} \tag{5}$$

where $\Delta L_{dj}$ and $\Delta L_{dj+1}$ represent the respective contributions of the two coupling elements seen by the individual resonator considered. The required design length $L_{dj}$ of the resonator is thus determined and displayed at the display device 24 (block 38).

The process is repeated until the widths of all of the coupling elements and the lengths of all of the resonators are determined. The initial geometrical parameters of the filter are thus known and the filter can be constructed.

Two microwave filters have been designed in accordance with the invention taking into account ten higher-order propagation modes. The first filter has a 390 MHz bandwidth with a 12.65 GHz center frequency. This filter is comprised of four resonators. The geometrical dimensions thereof are given in table A.

TABLE A

| | |
|---|---|
| $a_0$ = 19.050 mm | $L_1$ = 12.030 mm |
| $a_1$ = 9.600 mm | $L_2$ = 13.600 mm |
| $a_2$ = 6.385 mm | $L_3$ = 13.600 mm |
| $a_3$ = 5.860 mm | $L_4$ = 12.030 mm |
| $a_4$ = 6.385 mm | d = 2 mm |
| $a_5$ = 9.600 mm | |

Figure 11:
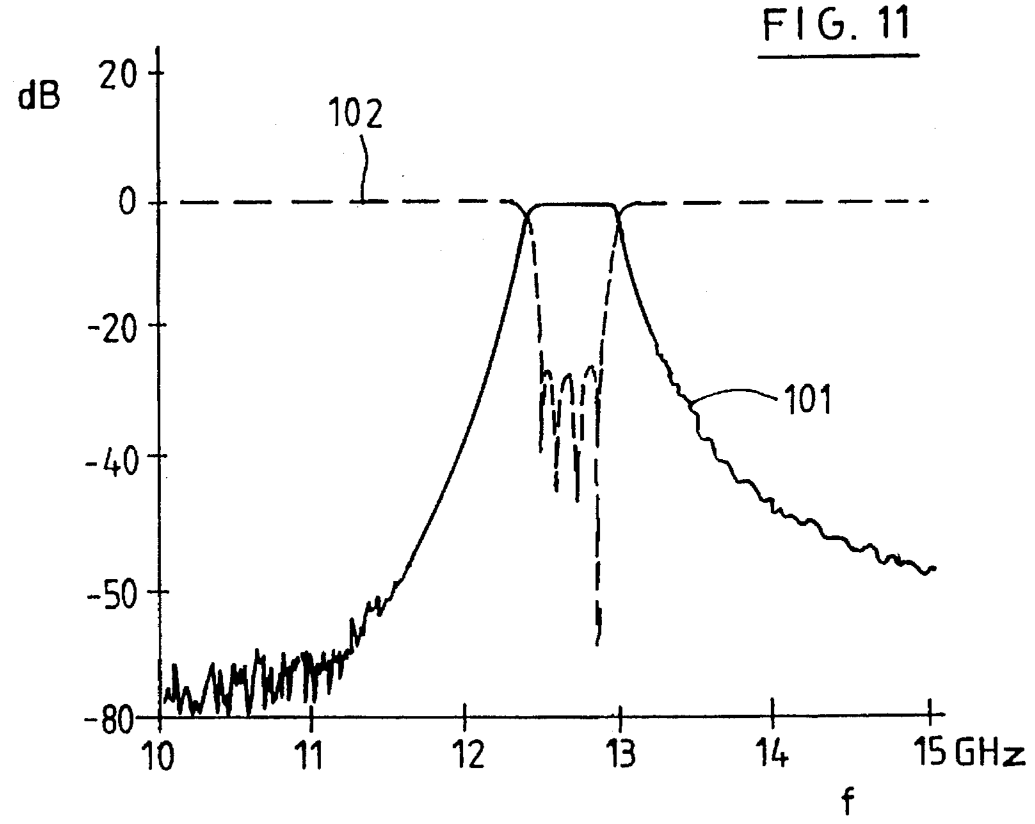
FIGS. 11 and 12 represent the measured characteristics of two examples of microwave filters designed in accordance with the invention.

FIG. 11 shows the simulated and measured electrical characteristics of the filter thus designed. Curve 101 shows the filter insertion loss, curve 102 shows the filter return loss. The rejection is higher than 50 dB at 11.7 GHz. As can be seen, there is very good agreement between the simulated and measured values.

The second filter designed has a 700 MHz bandwidth with a 12.15 GHz center frequency. This filter is comprised of five resonators. The geometrical dimensions thereof are given in table B.

TABLE B

| | |
|---|---|
| $a_0$ = 19.050 mm | $L_1$ = 11.835 mm |
| $a_1$ = 11.050 mm | $L_2$ = 13.763 mm |
| $a_2$ = 7.952 mm | $L_3$ = 14.079 mm |
| $a_3$ = 7.200 mm | $L_4$ = 13.763 mm |
| $a_4$ = 7.200 mm | $L_5$ = 11.835 mm |
| $a_5$ = 7.952 mm | d = 2 mm |
| $a_6$ = 11.050 mm | |

Figure 12:
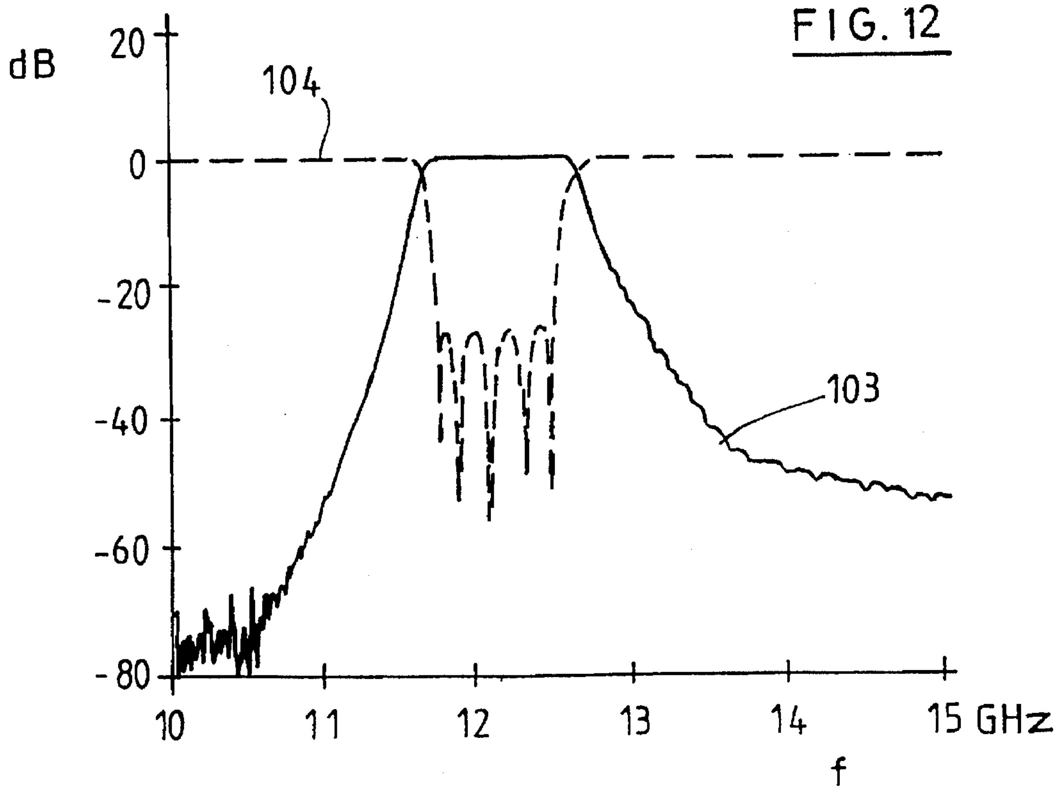

The simulated and measured characteristics of this filter are shown in FIG. 12. Curve 103 shows the insertion loss, curve 104 shows the return loss. The rejection is higher than 50 dB at 11 GHz. In this case too, there is very good agreement between the simulated and measured values.

Besides having the significant advantage of providing an accurate determination of the correct geometrical dimensions of a microwave filter in a very short time, the invention has the additional advantage of having a wide range of applicability in the design of microwave filters, in the sense that it also allows one to easily design a filter including different types of resonators, that is resonators coupled between each other by coupling elements, including some inductive coupling elements and some capacitive coupling elements. In addition, the coupling elements may have different thicknesses. This wide range of applicability of the system according to the invention makes it possible to adjust in an optimal way the effects of interference between propagation modes.

It is also worthy of note that the invention can be applied not only for the design of microwave filters but also for the design of more complex devices, e.g. a manifold multiplexer. Such a device consists of a number of waveguide filters connected to a short-circuited length of waveguide (the manifold). The main problem in the design of a manifold multiplexer resides in the fact that when the individual microwave filters are assembled together with the manifold, very strong interactions occur between the various discontinuities of the individual filters, and said interactions can completely change the behavior of the filters themselves. In practice, to recover the desired electrical behavior, it is necessary to adjust experimentally the geometrical parameters of the filters and the manifold dimensions. This traditional procedure is time-consuming and results in significant development time.

In the aforementioned application, the present invention also results in very substantial time savings because it allows decomposing the complex design task for the whole device to be constructed, e.g. a manifold multiplexer, into a number of clearly defined sub tasks that only involve the determination of a limited number of physical parameters in a single run, without requiring any experimental adjustment.

A manifold multiplexer can be designed using the procedure as outlined above to determine the physical parameters of the first cavity of waveguide filters. The procedure is then repeated with the addition of the second cavities of the filters and then the third cavities. Thereafter, the first cavities are connected to the manifold and the dimensions thereof are determined using the procedure according to the invention to synthesise the assembly thus formed.

Once the manifold has been determined, the procedure is used again with the other cavities connected to the manifold. The geometrical parameters of the complete device are thus determined without having to execute repeated experimental tunings as with the conventional procedures.

I claim:

1. A system for synthesizing a microwave filter having a rectangular waveguide with a plurality of tuned resonators coupled by coupling elements having a finite thickness, said coupling elements defining internal cross-sectional restrictions in said waveguide, said system comprising:

memory means for storing signals representing coupling coefficients ($Q_e$, $k_{j,j+1}$) and a design resonant frequency ($f_m$) for the resonators, wherein said coupling coefficients are a function of the coupling element geometry;

means responsive to signals indicative of a predetermined thickness for said coupling elements and an initial length ($L_m$) for said resonators, for controlling a computation unit to determine a variation in a relative width ($a_m/\lambda_{gm}$) for the coupling elements as a function of the coupling coefficients and the design resonant frequency stored in said memory means;

means for writing values for the relative width determined by said controlling means into said memory means;

means responsive to said coupling coefficients stored in said memory means for controlling the computation unit to determine a variation in an apparent resonator length ($\Delta L_m$) as a function of said coupling coefficients;

means for determining and displaying a design width for each of a pair of coupling elements operatively associated with each resonator; and means for determining and displaying a design length ($L_d$) for each resonator, said design length accounting for the respective contributions of said pair of coupling elements associated with the resonator;

wherein said system tunes said resonators by successively determining design widths for each of said coupling elements and design lengths for each of said resonators until all coupling element design widths and resonator design lengths have been determined.

2. A system in accordance with claim 1 wherein said coupling coefficients comprise external coupling coefficients ($Q_e$) and internal coupling coefficients ($k_{j,\, j+1}$), said system further comprising:

means for storing signals representing a transfer function of said filter in said memory means;

means for controlling said computation unit to determine the external coupling coefficients and the internal coupling coefficients of said coupling elements from the signals stored in said memory means; and means for writing the values of said coupling coefficients into said memory means.

3. The system of claim 1 where said finite thickness of said coupling elements is a constant, d.

4. The system of claim 1 where at least one of said coupling elements defines an iris with a circular cross-section.

5. The system of claim 1 where at least one of said coupling elements is positioned along a central longitudinal axis of said rectangular waveguide.

6. The system of claim 1 where said plurality is a number greater than two.

7. A method for synthesizing a microwave filter having a rectangular waveguide formed from a plurality of tuned resonators coupled by coupling elements having a finite thickness, said coupling elements defining internal cross-sectional restrictions in said waveguide, comprising the steps of:

providing signals representing coupling coefficients ($Q_e$, $k_{j,j+1}$) and a finite thickness for said coupling elements, and a design resonant frequency ($f_m$) and an initial length ($L_m$) for said resonators, wherein said coupling coefficients are a function of the coupling element geometry;

determining, in response to said signals, a new relative width ($a_m/\lambda_{gm}$) for a coupling element as a function of said coupling coefficients and said design resonant frequency;

storing the relative width for said coupling element;

determining a variation in an apparent resonator length ($\Delta L_m$) as a function of said coupling coefficients;

determining and displaying a design width for each of a pair of coupling elements operatively associated with each resonator;

determining and displaying a design length ($L_d$) for each resonator, said design length accounting for the respective contributions of said pair of coupling elements associated with the resonator; and repeating said foregoing steps until design widths for each of said coupling elements and design lengths for each of said resonators have been determined.

8. A method in accordance with claim 7 wherein said coupling coefficients comprise external coupling coefficients ($Q_e$) and internal coupling coefficients ($k_{j,j+1}$), said method comprising the further steps of:

providing signals representing a transfer function of said filter;

determining the external coupling coefficients and the internal coupling coefficients of said coupling elements in response to said signals; and storing the values of said external and internal coupling coefficients.

9. The method of claim 7 where said finite thickness of said coupling elements is a constant, d.

10. The method of claim 7 where at least one of said coupling elements defines an iris with a circular cross-section.

11. The method of claim 7 where at least one of said coupling elements is positioned along a central longitudinal axis of said rectangular waveguide.

12. The method of claim 7 where said plurality is a number greater than two.

* * * * *